United States Patent [19]

Irie

[11] Patent Number: 5,621,475
[45] Date of Patent: Apr. 15, 1997

[54] CIRCUIT FOR JUDGING THE EXISTENCE OF TELEVISION IMAGE SIGNALS

[75] Inventor: Toshiaki Irie, Daito, Japan

[73] Assignee: Funai Electric Co., Ltd., Osaka, Japan

[21] Appl. No.: 336,313

[22] Filed: Nov. 8, 1994

[30] Foreign Application Priority Data

Nov. 9, 1993 [JP] Japan .................. 5-304805

[51] Int. Cl.⁶ .................................................. H04N 5/08
[52] U.S. Cl. ........................................ 348/607; 348/533
[58] Field of Search .................................. 348/607, 194, 348/533, 661, 619, 622, 683

[56] References Cited

U.S. PATENT DOCUMENTS

| | | | |
|---|---|---|---|
| 4,614,973 | 9/1986 | Sorenson | 348/533 X |
| 4,620,312 | 10/1986 | Yamashita | 375/238 |
| 4,763,341 | 8/1988 | Murphy | 377/20 |
| 5,034,815 | 7/1991 | Shibayama | 348/533 |

*Primary Examiner*—John K. Peng
*Assistant Examiner*—Nathan J. Flynn
*Attorney, Agent, or Firm*—Lackenbach Siegel Marzullo Aronson & Greenspan, P.C.

[57] ABSTRACT

The present invention provides a more reliable circuit for judging the existence of television image signals. A circuit for judging the existence of television image signals by counting the number of edges of the synchronous signals of a composite synchronous signals for a certain period, and judging the existence of TV image signals, wherein a mask timer circuit which masks signals generated following the synchronous signals for a certain period after the composite synchronous signal is detected, is installed before a synchronous counter.

3 Claims, 4 Drawing Sheets

CIRCUIT FOR JUDGING THE EXISTENCE OF TELEVISION IMAGE SIGNALS

2. BACKGROUND OF THE INVENTION

This invention relates to a circuit for judging the existence of television (TV) image signals such as applied to NTSC system or PAL system TVs.

FIG. 3 is a conceptional block diagram showing a construction of essential parts of the conventional circuit for judging the existence of television image signals. In the same drawing, numeral 1 is the conventional circuit for judging the existence of television image signals, numeral 2 is an input terminal of composite synchronous signals, and numeral 3 shows a synchronous counter for counting edges of the composite synchronous signals. Also, numeral 8 is a counted number analyzer for receiving the counted synchronous signals from the synchronous counter for analyzing counted values and for outputting a judged result, and numeral 9 is an output terminal for generating the judged result.

The operation of the conventional circuit 1 is next described as follows.

When normal image signals are obtained as shown in FIG. 4A, the edges of the horizontal synchronous signals of the normal image signals are detected, then the composite synchronous signals as shown in FIG. 4B are generated and supplied into the input terminal 2 of the image judging circuit 1. The synchronous counter 3 then counts the number of each of the rising edges of the composite synchronous signals, and the counted number analyzer 8 judges that the normal image signals are being transmitted based on the number of counted edges, and finally the judged results are output from the terminal 9.

In receiving the television broadcasting signals, as the conventional image signal judging circuit 1 is constructed as described above, it becomes impossible to see the television images because the synchronous counter detects the noise caused by the distortion of the image signals themselves together with the normal image signals, despite normally receiving the image signals, and the counter number analyzer 8 misjudges the noise as the correct normal signals.

Namely, noise caused by the aforementioned distortion is apt to be generated immediately after the horizontal synchronous signals, and practically as shown in FIGS. 5A and 5B, noise 10 is generated.

In the television image signals including the noise 10 shown in FIG. 5A, composite synchronous signals generated by detecting the edge of horizontal synchronous signals of the image signals, includes noise 10 shown in FIG. 5B, and accordingly the counted number detected by the synchronous counter 3 becomes two times the number of normal image signals, and the counted number analyzer 8 issues a signal indicating the nonexistence of image signals. Namely, there was a problem that the analyzer misjudges that image signals cannot be detected in spite of receiving normal image signals.

This invention was developed to overcome the above-mentioned drawbacks, and the object thereof is to provide an image signal judging circuit enabling an increase in the reliability thereof.

3. BRIEF DESCRIPTION OF THE INVENTION

The present invention provides a circuit for judging the existence of the television image signals in the composite signals, wherein a raised pulse preventing means for eliminating the noise pulses included in the composite signals is installed. According to the present invention, the inventors have found that it is possible to prevent misjudging caused by noises generated by distortion included in TV image signals.

The circuit is further characterized in counting the number of edges of the synchronous signals by a synchronous counter during a prescribed period of the composite synchronous signals, and in judging the existence of the television image signals based on the counted number thereof.

Furthermore, in the circuit judging the noise pulses preventing means is provided a mask timer circuit in front of the judging circuit for masking the television image signals for a certain period after detecting the composite signals.

In the judging circuit, it is also provided that a switching circuit for switching the television image signals is provided together with the noise pulses preventing means and that the television image signals are shut off for a certain period by putting off the switching circuit.

The judging circuit according to the present invention is able to increase the reliability of judging the existence of television image signals by eliminating the signal edges including misjudgment based upon the noises appearing immediately after the composite synchronous signals.

4. BRIEF DESCRIPTION OF THE DRAWINGS

5. DETAILED DESCRIPTION OF THE INVENTION

One embodiment according to the present invention is described in detail with reference to the drawings as follows.

Figure 1A:
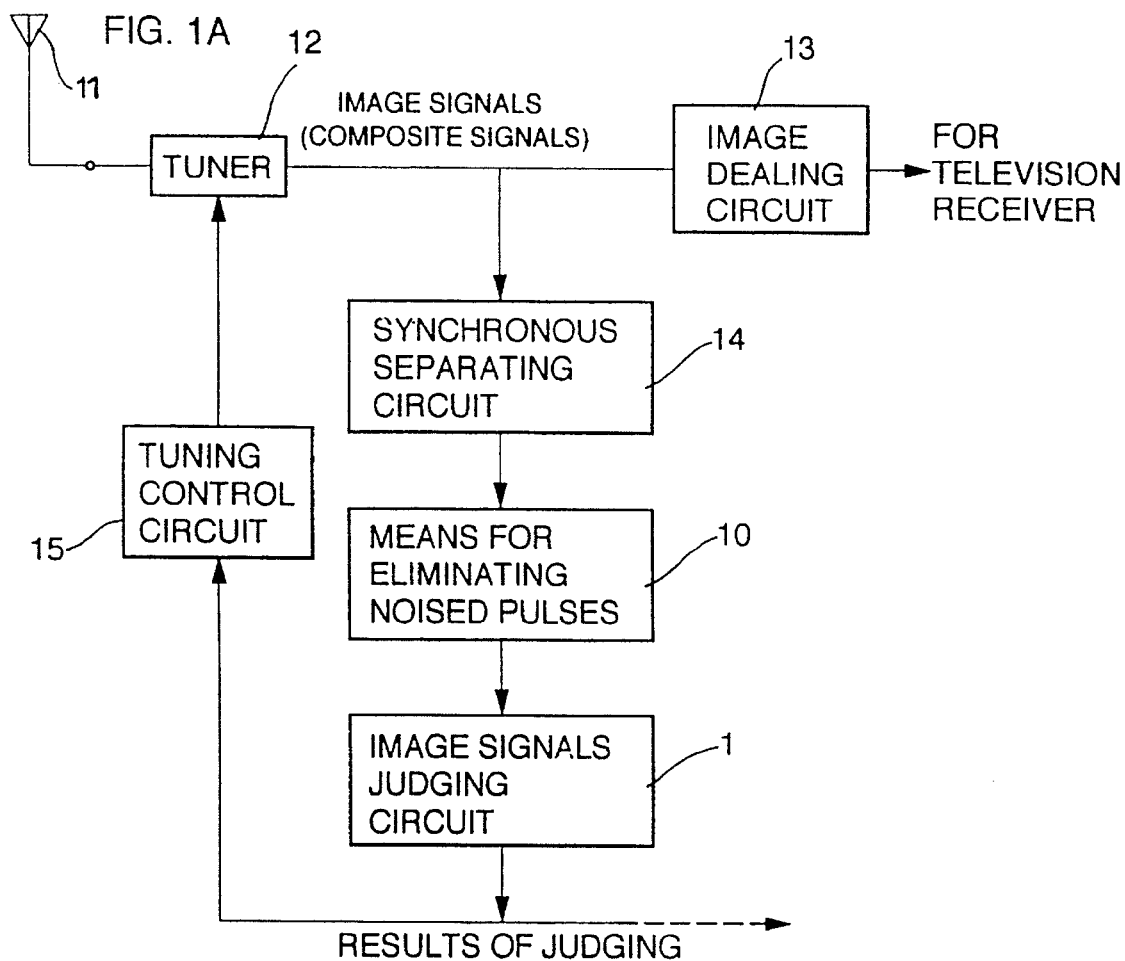
FIG. 1A is a block diagram showing the television receiver according to one embodiment of the present invention.

FIG. 1A is a block diagram showing a television receiver according to this invention.

Figure 1B:
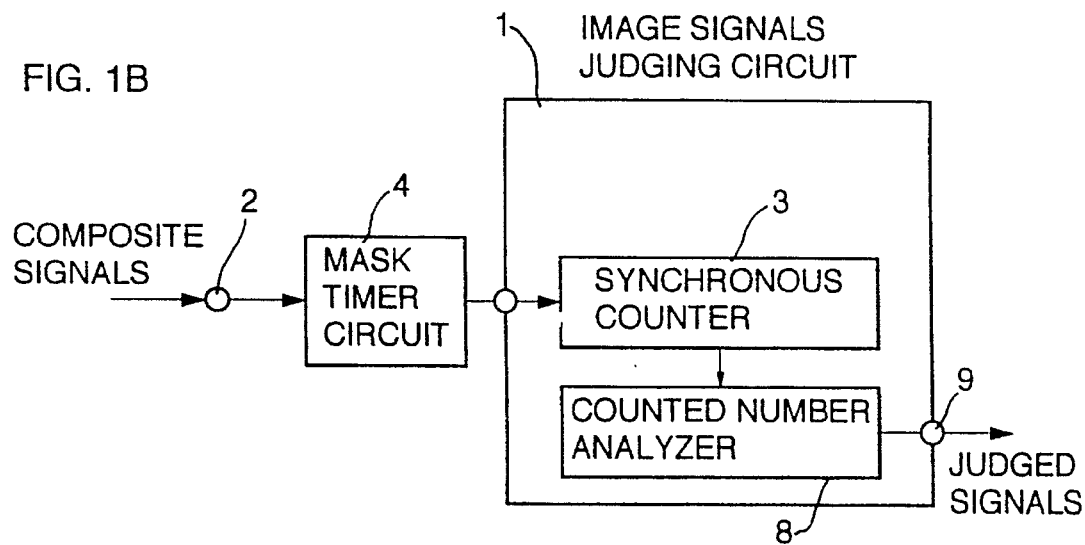
FIG. 1B is a block diagram showing the essential parts of the image signals judging circuit according to one embodiment of the present invention.

FIG. 1B is a block diagram showing the essential parts of the image signals adjusting circuit according to this embodiment shown in FIG. 1A.

Figure 3:
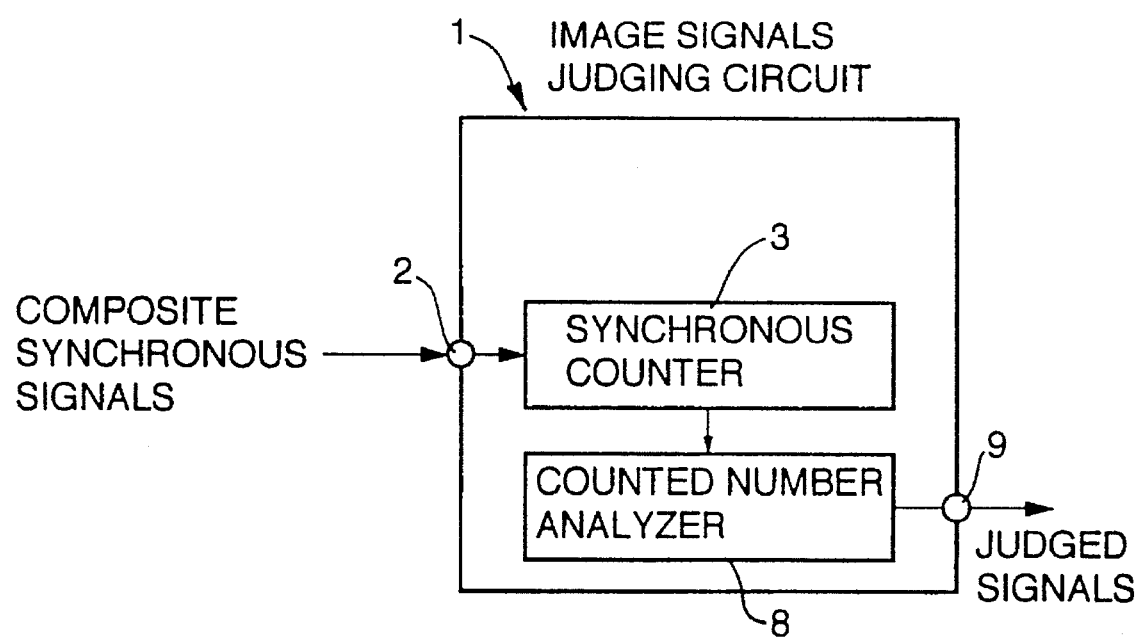
FIG. 3 is a block diagram showing the essential parts of the conventional circuit.
Figure 4A:
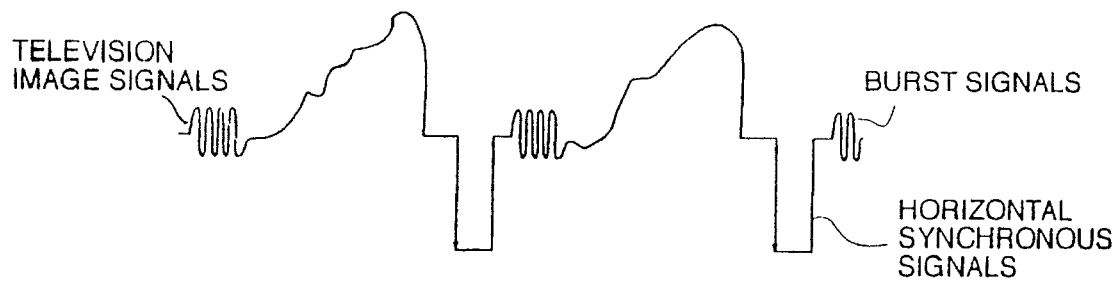
FIGS. 4A and 4B are wave diagrams showing the composite synchronous signals supplied to a conventional circuit for judging the existence of television image signals.
Figure 4B:
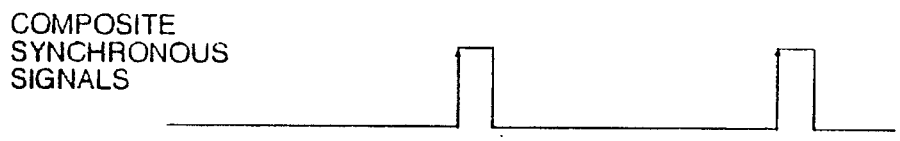
Figure 5A:
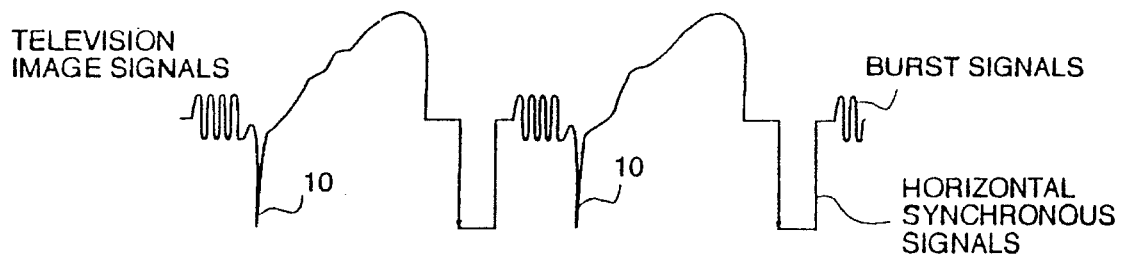
FIGS. 5A and 5B show wave diagrams of the composite synchronous signals when a misjudgment occurs in the conventional circuit for judging existence of television image signals.
Figure 5B:
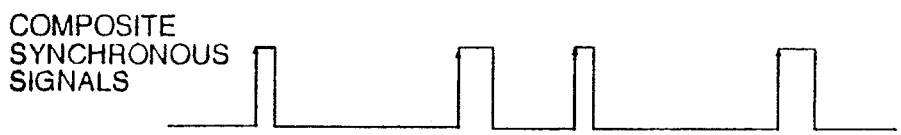

In these drawings, parts that are the same or corresponding to those shown in FIG. 3 are identified with the same reference numerals and eliminated from the description. In FIG. 1A, numeral 10 is a means for eliminating noise pulses, numeral 11 is an antenna of the television receiver, numeral 13 is a circuit for dealing the composite image signals, numeral 14 is a circuit for separating the synchronous signals, and numeral 15 is a control circuit for tuning.

In FIG. 1B, numeral 4 is a mask timer circuit which eliminates the noise pulses at the means for eliminating noise pulses and composed and controlled with a microcomputer the same as the synchronous counter 3.

The mask timer circuit 4 detects initial falling edges of the horizontal synchronous signals and generates masking signals with the timing detecting the edges for masking above-mentioned edge detection while the timer is working.

Figure 2A:
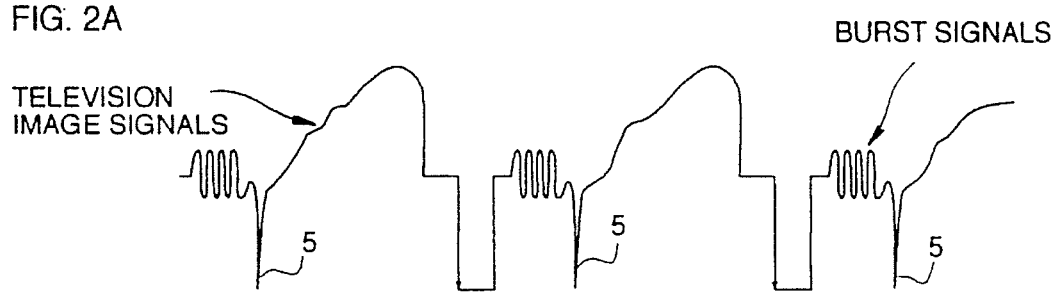
FIGS. 2A, 2B, 2C and 2D show wave diagrams for explaining the working operations of the circuit according to the same embodiment of the present invention shown in FIG. 1.
Figure 2B:
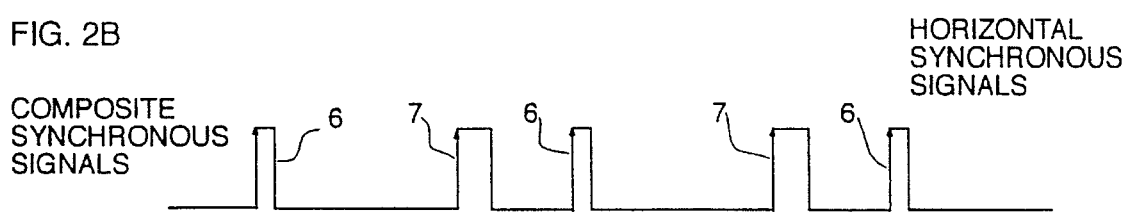
Figure 2C:
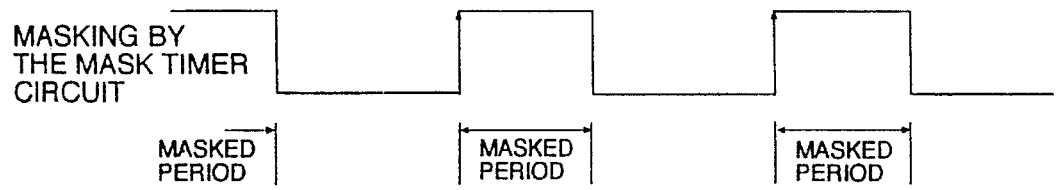
Figure 2D:

FIGS. 2A, 2B, 2C and 2D are signal wave diagrams showing the operation of the circuit judging the existence of television image signals. In these drawings, FIG. 2A shows the image signals in which misjudging causes noise 5 to be included, and FIG. 2B shows the composite synchronous signals generated from the horizontal synchronous signals combined with the image signals shown in FIG. 2A, and FIG. 2C shows an output wave generated by the mask timer circuit 4, and FIG. 2D shows the waves input into the synchronous counter 3 for counting the number of pulses.

The operation of the circuit for judging the existence of television image signals according to the embodiment is next described as follows.

In the image signals including the misjudging causes such as noise 5 as shown in FIG. 2A, the composite synchronous signals supplied to the input terminal 2 of the judging circuit 1 are affected by the misjudging causes such noise 5 as shown in FIG. 2A, and therefore pulses 6 causing the misjudging are generated.

The mask timer circuit 4 detects the edges 7 of the rising composite synchronous signals synchronized to the timing of the edges of the horizontal synchronous signals, and starts the timer for masking the edges of the composite synchronous signals for the specified period set in a ROM of the image signals judging circuit 1 composed with the microcomputer (namely during masked periods). In consequence, the edges 6 which cause misjudging, shown in FIG. 2B, are masked, and signal waves shown in FIG. 2C are output to the synchronous counter 3. The synchronous counter 3 counts numbers of the raised edges of the signal waves shown in FIG. 2D during the specified period, and successively the counted number analyzer 8 judges the existence of the image signals considering the counted number and outputs the judged result into the terminal 9.

In this embodiment, as described above in detail, since the signals included in the specified period following the composite synchronous signals is masked by the mask timer circuit 4, during the specified period set in the image signals judging circuit 1, the factors causing the misjudging such as noise are consequently preventable.

Furthermore, in the embodiment described above, the mask timer circuit 4 is composed so that the timer period was determined by the software installed in the ROM of the image signal judging circuit 1 comprised with the microcomputer, which is not to say that it may be possible to determine the timer period by applying the adequate hardware. It is also possible to eliminate noises pulses by shutting off TV image signals with a switching circuit during a certain period.

As described above, according to the present invention, it is possible to prevent misjudging caused by noise generated by the distortion included in the image signals, by installing a mask timer circuit in front of the synchronous counter.

What is claimed is:

1. A circuit for establishing the existence of a television image signal in a composite video signal which includes horizontal synchronous signals and superimposed noise signals within predetermined time periods following the horizontal synchronous signals, each horizontal synchronous signal having a leading edge, the circuit comprising: separating means for separating the horizontal synchronous signals and the noise signals from the composite signal; noise elimination means for receiving said synchronous signals and the noise signals from said separating means and for eliminating the noise signals by masking the noise signals during each of the predetermined periods following each of the horizontal synchronous signals, said noise eliminating means outputting noise-free horizontal synchronous signals; and image determining means for receiving the noise-free horizontal synchronous signals and determining the existence of a television image signal by counting the number of the noise-free horizontal synchronous signals and providing an output signal representing the existence of the television image signal when a predetermined count is established, said noise elimination means including a mask timer which produces a masking pulse having a time period substantially equal to each of said predetermined time periods, said mask timer being formed as a memory timer in a memory for a microcomputer and triggered by a leading edge of each of the horizontal synchronous signals and outputting said mask pulse having a predetermined level from a time that said memory timer is triggered to a time that said time period elapses.

2. A circuit as defined in claim 1, wherein said noise elimination means comprises a switching circuit for turning off said television image signals during said predetermined periods to eliminating the noise.

3. A circuit as defined in claim 1, wherein said image determining means comprises a synchronous counter.

* * * * *